Sept. 6, 1966  K. BRATZLER  3,271,110
METHOD OF PRODUCING HYDROGEN
Filed Nov. 6, 1961  3 Sheets-Sheet 1

Inventor:
KARL BRATZLER
By Toulmin & Toulmin
Attorneys

Sept. 6, 1966     K. BRATZLER     3,271,110
METHOD OF PRODUCING HYDROGEN
Filed Nov. 6, 1961     3 Sheets-Sheet 2

Inventor:
KARL BRATZLER
By Toulmin & Toulmin
Attorneys

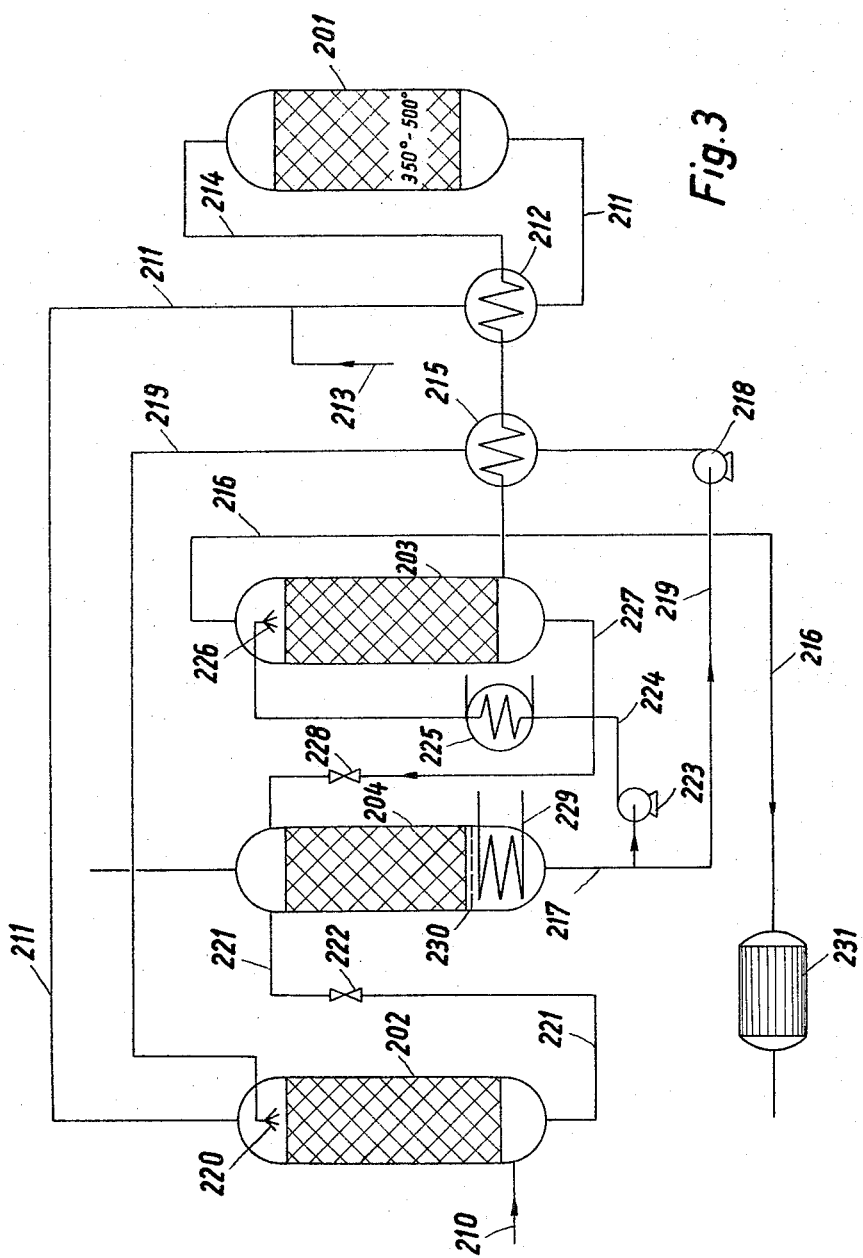

United States Patent Office 3,271,110
Patented Sept. 6, 1966

3,271,110
METHOD OF PRODUCING HYDROGEN
Karl Bratzler, Bad Homburg vor der Hohe, Germany, assignor to Metallgesellschaft Aktiengesellschaft, Frankfurt am Main, Germany
Filed Nov. 6, 1961, Ser. No. 150,543
Claims priority, application Germany, Nov. 12, 1960, M 47,102
1 Claim. (Cl. 23—213)

The present invention relates to a method of operating an installation for the conversion of carbon monoxide, more particularly, to the purification of hydrogen, or gases rich in hydrogen, such as synthesis gas, obtained from carbon monoxide or gas mixtures rich in carbon monoxide by a reaction known as conversion which consists of reacting the carbon monoxide with steam.

Suitable gases which are rich in carbon monoxide are produced in processes in which solid fuels are coked or gasified or in which liquid or gaseous fuels are thermally or catalytically oxidatively decomposed ("partial combustion"). After having undergone a preliminary purification by the removal of tars, dusts and acid gaseous components, particularly of carbon dioxide, hydrogen sulphide and hydrogen cyanide, the gases are saturated with water vapor and subjected to thermal or catalytic conversion.

Catalytic conversion is performed at normal or elevated pressures and at temperatures between 350 and 500° C., in contact with catalysts of iron oxide, or oxides of cobalt and molybdenum.

The hot converted gas is first cooled in heat exchangers for the recovery of heat and then by subjection to trickling cold water. The water which is withdrawn hot from the cooler is used for saturating the incoming crude gas with water vapor. Known converters thus comprise a water circulating system through two exchanger columns one of which serves as a saturator before conversion and the other as a cooler after conversion.

The converting reaction transforms carbon monoxide by reaction with steam into carbon dioxide and hydrogen. At the same time, organic sulphur compounds which had not been absorbed when the crude gas was subjected to the preliminary purification are decomposed to form hydrogen sulphide. Even when the crude gas is carefully purified, the converted gas will still contain hydrogen sulphide and generally also considerable quantities of carbon dioxide. These gaseous impurities which are formed in the conversion process are scrubbed out in conventional manner, for instance, with aqueous alkaline absorbent solutions.

While operating such converting installations it has been frequently found that the water which is cycled through the saturator and through the cooler in front of and behind the converter tower, respectively, gradually becomes enriched with hydrogen sulphide and with carbon dioxide. The hydrogen sulphide is introduced into the pre-purified gas, and reacts with oxygen contained in the crude gas to cause elemental sulphur as well as oxygen-containing acids of sulphur to accumulate in the circulating water. The elemental sulphur is deposited on the heat exchanging elements of the heat exchanger columns and may eventually choke them. The acids formed by the sulphur give rise to all kinds of troubles due to corrosion, which can be overcome only by using expensive corrosion-resistant materials.

It has now been found that these difficulties can be eliminated by adding substances which bind the hydrogen sulphide and render the oxygen content of the crude gas innocuous to the water circulating through the cooler and the saturator. In a further development, the cooler and saturator can be used to perform at least a part of the functions of purifying the converted and crude gas, particularly that of desulphurisation, by employing as the circulating liquid one of the known aqueous alkaline absorbent solutions for scrubbing acid components from gas mixtures. Incorporated in the circulating system of the cooler and saturator is suitable regenerative or desorption equipment of a conventional kind.

Suitable absorbent liquids for circulation are alkali metal salts of weak inorganic and organic acids, such as phosphoric acid, boric acid or acids of arsenic. Examples of suitable organic acids are amino acids and oxyaromatics. Finally, aqueous solutions of difficultly volatile organic bases, such as alkanol amines, can be used.

For regeneration, use is made of an exchanger column in which the solution employed is heated and/or it which it can be blown out with steam, air, or inert gases.

The regenerating equipment is incorporated in the converting plant between the cooler and saturator. The liquid from the cooler is introduced into the regenerating tower from which the purified and possibly further heated solution is withdrawn to be introduced into the head of the saturator.

A part of the solution is divided from the main liquid stream circulating through saturator, cooler and regenerating column at a point preceding the latter, for the purpose of separating those reaction products from the solution which cannot be removed by heating and steaming. If alkali metal carbonates, phosphates, borates or phenolates are used and the solution is regenerated with air, these reaction products take the form of alkali metal sulphates and/or alkali metal thiosulphates which can be crystallized by evaporating and cooling the solution.

When alkali metal arsenate solutions are used, aeration of the charged solution permits elemental sulphur to be removed. The regenerating column then serves for driving out the absorbed carbon dioxide. The separation of the sulphur is effected in a branch stream of the circulating solution in an aerating column. The elemental sulphur is filtered from the aerated solution and the fully reactive filtrate is returned to the main cycle. This method permits the hydrogen sulphide to be selectively separated. In such a case the desorption tower can be omitted. The solution is circulated through saturator, cooler and an oxidation tower, or the solution is cycled through the saturator and cooler and a side stream tapped from this cycle is taken through the oxidation tower and a sulphur separator before being returned to the cycle.

If it is desired not only to moisten but also to purify the crude gas in the saturator, the saturator may be associated with an independent liquid circulating system which includes the regenerating tower, thus permitting the saturator to be operated as a hot gas scrubber and the cooler as a cold gas scrubber.

It is therefore the principal object of the present invention to provide a novel and improved process for the purification of crude and converted gas occurring in a conversion of carbon monoxide.

It is a further object of the present invention to provide a method of operating an installation for the conversion of carbon monoxide whereby purified gases are obtained therefrom particularly gases which have been desulphurized.

Other objects and advantages of the present invention will be apparent upon reference to the accompanying description when taken in conjunction with the following drawings, wherein FIGURE 1 is the flow diagram of converter plant in which a solution circulated through a cooler and a saturator is regenerated by air oxidation;

FIGURE 3 is the flow diagram of a converter plant in which the solution treated in a regenerating tower is divided into two streams, one passing through the cooler and the other through the saturator but both returning to the same regenerating tower.

Figure 1:
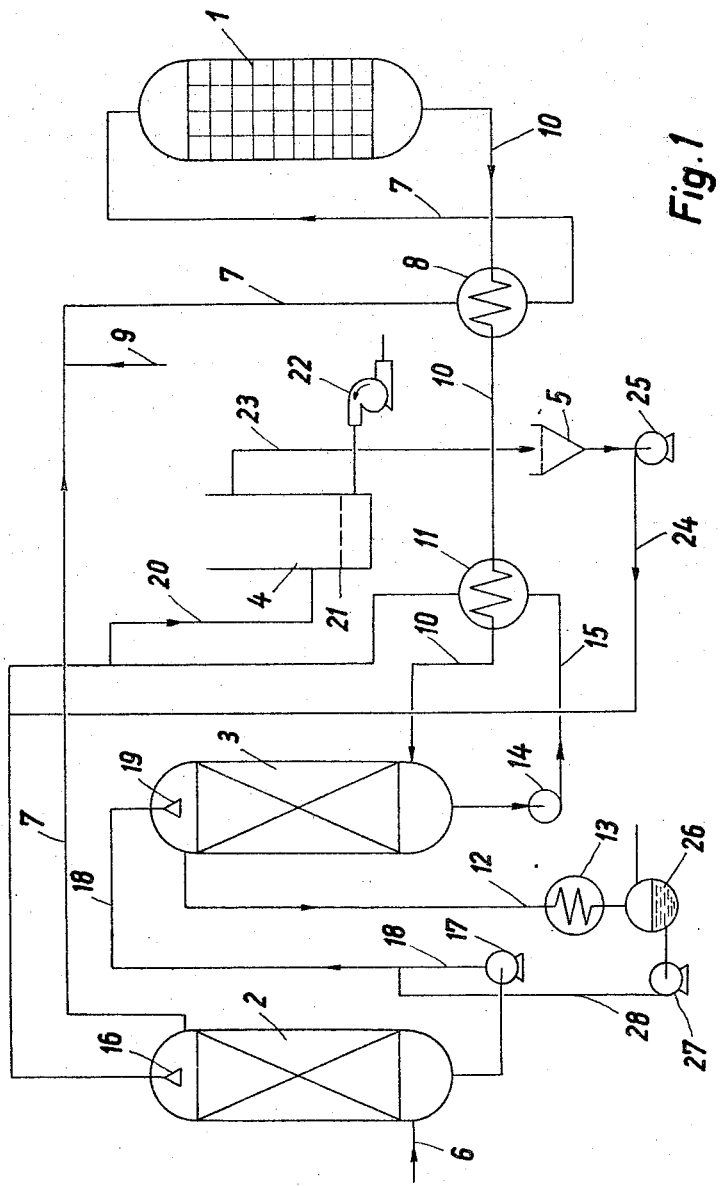

The plant illustrated in FIGURE 1 comprises a converting tower 1, preceded by a saturator 2 and followed by a gas cooler 3, an aerating tower 4 and filtering equipment 5. The gas for conversion enters the saturator 2 through a pipe 6. In the saturator 2 the gas is washed by contact with an alkaline solution, preferably one that absorbs hydrogen sulphide, and is at the same time saturated with water vapor. The gas is then passed through a pipe 7 and through a heat exchanger 8 to the converting tower 1. Additional steam is introduced into the gas in the pipe 7 through a branch pipe 9. The converted gas leaves the converted tower 1 through a pipe 10 and flows through heat exchangers 8 and 11 to the lower gas inlet of the gas cooler 3 in which it is cooled and washed by the absorbent solution, finally leaving through a pipe 12 and a cooler 13 for further use.

The solution which is heated in the gas cooler 3 is pumped by a pump 14 through a pipe 15 and the heat exchanger 11 to a distributor 16 in the head of the saturator 2. The evaporation caused by contact with the crude gas in the saturator cools the solution in saturator 2 and the cold solution is then pumped by a pump 17 through a pipe 18 to a distributor 19 in the head of the gas cooler 3.

From the pipe 15 in the circulating system of the solution through the saturator 2 and the cooler 3, part of the solution is tapped through a branch pipe 20 and introduced to the head of the aerating tower 4. An air blast generated by a compressor 22 is fed through a perforated floor 21 of the tower 4 and serves to oxidize the hydrogen sulphide absorbed by the solution to elemental sulphur. The solution containing this sulphur flows through a pipe 23 to the filter 5, and the clarified and reactivated solution is then pumped by a pump 25 through a pipe 24 back into the main circulating pipe 15 at a point in front of the branch 20.

Oxidation in tower 4 may be continued beyond the sulphur stage to the sulphate. In such a case the filter 5 is not needed, and is replaced by a crystallizer in which the alkali metal sulphate is crystallized in conventional manner by cooling the solution and from which it is then removed.

Water loss in the cycle due to evaporation is made up by condensate from the cooler 13 which is collected in a separator 26 and introduced into the pipe 18 by a pump 27 through a pipe 28.

Solutions which are simultaneously capable of saturating the crude gas with vapor, of cooling the converted gas and of binding the hydrogen sulphide contained in the crude and converted gas include, for instance, aqueous solutions of an alkali metal arsenate or an alkali metal ferricyanide. A solution of this kind first binds the hydrogen sulphide and, when the solution is treated with gases containing oxygen, particularly air, the hydrogen sulphide is oxidized to elemental sulphur, the solution thus recovering its ability to accept more hydrogen sulphide.

The following example serves to illustrate the manner of operation of the installation shown in FIG. 1.

*Example I*

In an illuminating gas which has been prepurified for the purpose of a subsequent detoxication it is proposed to replace the carbon monoxide by hydrogen by conversion. The pre-purified gas has the following composition in percent by volume:

| | |
|---|---|
| $CO_2$ | 2.1 |
| $H_2S$ | (¹) |
| Hydrocarbons | 21.2 |
| CO | 11.1 |
| $H_2$ | 46.3 |
| $N_2$ | 19.0 |
| $O_2$ | 0.2 |

¹ 0.007=110 mg./cubic meter under standard conditions.

The hydrocarbons are those from $C_1$–$C_3$, i.e. methane, ethylene, propane, and propylene.

The gas also contains 140 mg. per stand. m.³ (cubic meter under standard conditions) of organic suphur compounds which in conversion give rise to 123 mg. per stand. m.³ of hydrogen sulphide.

5300 stand. m.³ per hour of this pre-purified illuminating gas are converted in the plant illustrated in FIGURE 1.

The crude gas enters the saturator 2 through the pipe 6 at ambient temperature. An aqueous solution of sodium arsenate containing 14 g. of $Na_2O$ and 76 g. of $As_2O_3$, warm from the coller, trickles through the gas in the saturator. The solution absorbs the hydrogen sulphide from the gas and at the same time raises the gas temperature to 66° C. at which temperature the gas is saturated with water vapor. In the pipe 7, which leads to the converting tower the temperature of the gas is raised to 160° C. by the admission through pipe 9 of compressed steam from a heater and it is finally elevated to reaction temperature in the heat exchanger 8 by heat exchange with converted gas. The reaction in then performed in the converting tower 1 at this temperature in contact with an iron oxide catalyst.

The converted gas which per stand. m.³ contains 9.1% $CO_2$ and 123 mg. of hydrogen sulphide formed during the conversion is cooled to about 158° C. in the two heat exchangers 8 and 11. At this latter temperature the gas enters the gas cooler 3 where it is cooled to 61° C. by contact with the trickling solution from the saturator which absorbs the hydrogen sulphide in the converted gas. The purified and cooled gas leaving the final cooler 13 has the following composition in percent by volume:

| | |
|---|---|
| $CO_2$ | 8.0 |
| $H_2S$ | 0.0 |
| Hydrocarbons | 23.1 |
| CO | 1.2 |
| $H_2$ | 54.3 |
| $N_2$ | 13.4 |
| $O_2$ | 0.0 |

The hydrocarbons are those from $C_1$–$C_3$, i.e. methane, ethylene, propane, and propylene.

In the circulating system containing the saturator 2 and the gas cooler 3 the sodium arsenate solution is maintained in circulation at the rate of 37 m.³ per hour. From this system 117 liters of solution are withdrawn per hour through the pipe 20, cooled to about 42° C. and introduced into the aerating tower, where it is regenerated by aeration. The precipitated sulpur is retained in the filter 5 and the clear regenerated solution is returned to the circulating system.

Figure 2:
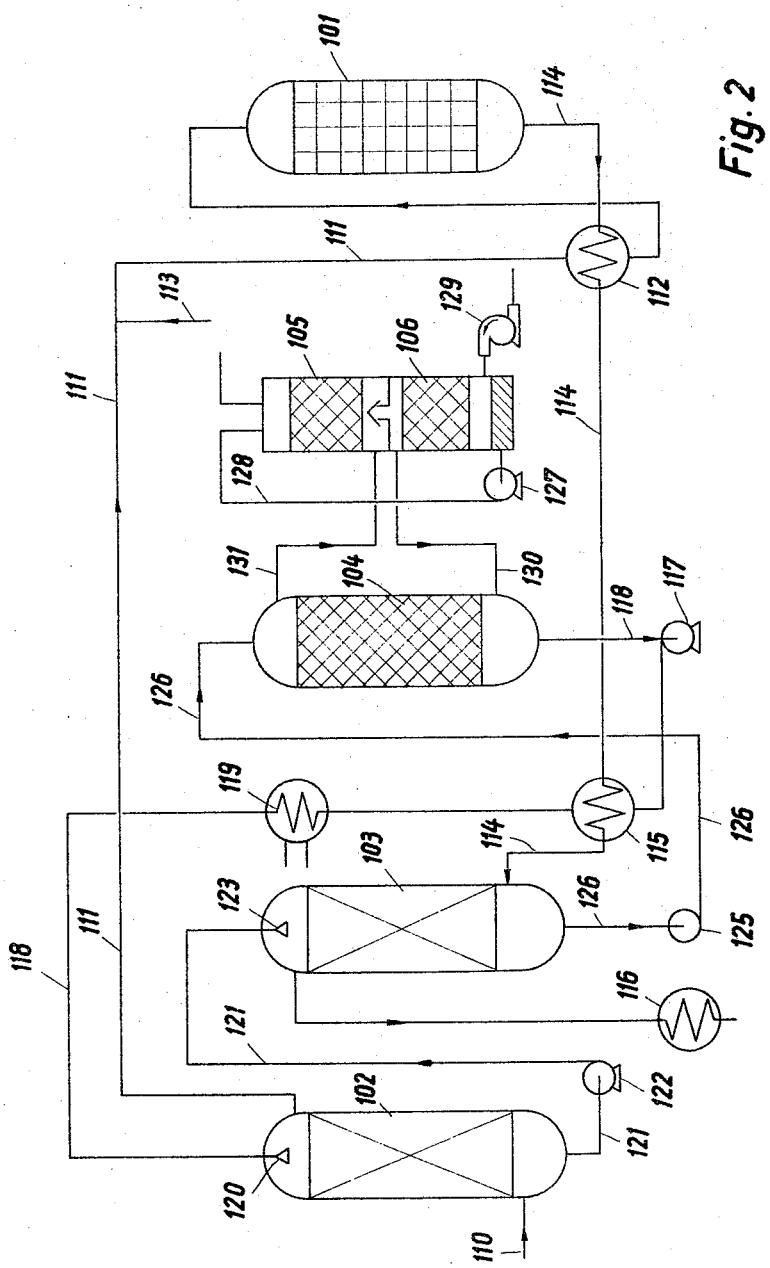
FIGURE 2 is the flow diagram of a converter plant in which a regenerator is included in the cycle of the solution through saturator and cooler.

In the installation illustrated in FIGURE 2 an aqueous solution of sodium arsenate is circulated through a system comprising a saturator and a cooler. However, the volume of this solution is sufficient for washing the acid components $CO_2$ and $H_2S$ out of the unconverted as well as out of the converted gas.

The plant shown in FIGURE 2 comprises a converting tower 101, a saturator 102, a gas cooler 103, a regenerating tower 104 and an air heater and saturator 105.

The prepurified gas which it is intended to convert enters the sump of the saturator 102 from a pipe 110 flowing countercurrently to the absorption solution entering the saturator through distributor head 120, and leaves the saturator cleaned and moistened through a pipe 111, and after passing through a heat exchanger 112 enters the converting tower 101. Compressed steam is introduced into the gas in the pipe 111 through a branch pipe 113.

The converted gas from the converting tower 101 flows through a pipe 114 into the gas cooler 103 and on its way it passes through the heat exchanger 112 and is precooled by the regenerated solution in a heat exchanger 115. The purified, converted and cooled gas from the gas cooler 103 is taken through a final cooler 116 and is then ready for further use.

Regenerated solution from the regenerating tower 104 is forced by a pump 117 in a pipe 118 through the heat exchanger 115, and possibly a heater 119, into the distributor head 120 of the saturator 102. The cooled solution collecting in the sump of the saturator is then pumped through a pipe 121 by a pump 122 to a distributor 123 in the head of the gas cooler 103. The hot charged solution collecting in the sump of the gas cooler 103 is pumped by a pump 125 through a pipe 126 into the regenerating tower 104 where it is regenerated with hot moist air. A blower 129 forces fresh air into the lower part of the tower 105 into which hot water trickles from the upper part of the tower. The hot moist air enters the regenerating tower 104 through a pipe 130. The air which emerges charged with steam and carbon dioxide from the head of tower 104 is introduced through a pipe 131 into the upper part of tower 105 and exposed in counterflow to the trickling water from the sump of tower 105, which is circulated by a pump 127 through a pipe 128. The water which has thus been warmed returns to the lower part of the tower.

The operation of plant according to FIGURE 2 may be illustrated by the following example:

*Example II*

A pre-purified illuminating gas is to be detoxicated by reaction of the carbon monoxide which it contains with steam. The crude gas has the following composition in percent by volume:

| | |
|---|---|
| $H_2S$ | (¹) |
| $CO_2$ | 2.1 |
| Hydrocarbons | 21.3 |
| CO | 11.7 |
| $H_2$ | 46.0 |
| $N_2$ | 18.7 |
| $O_2$ | 0.2 |

¹ 0.008=116 mg. per stand. m.³

The hydrocarbons are those from $C_1$–$C_3$, i.e. methane, ethylene, propane, and propylene.

The gas also contains 142 mg. of organic sulphur compounds per stand. m.³. These are transformed into hydrogen sulphide during conversion. 6250 stand. m.³ per hour of this gas are converted in the converting tower 101 by contact with an iron oxide catalyst at normal pressure and at a temperature of 360° C.

The crude gas enters the saturator 102 through the pipe 110 at ambient temperature. Carbon dioxide and hydrogen sulphide are removed from the gas by contact with the absorbent solution, i.e., an aqueous solution of an alkali metal arsenate or an alkali metal ferricyanide. At the same time the gas is heated to 67° C. and saturated with water vapor. Superheated steam is added at 113 to the gas flowing through the pipe 111 to the converter, the gas temperature being thereby raised to 160° C. In the heat exchanger 112 the temperature of the gas is further raised to 360° C. by heat exchange with the converted gas. The gas then enters the converting tower 101. The gas leaving the tower through the pipe 114 is taken to the gas cooler 103 but on its way it is first partly cooled to 163° C. by heat exchange in the heat exchanger 112 with the gas which is to be converted and by heat exchange in the heat exchanger 115 with regenerated solution. In the gas cooler 103 the converted gas is purified by absorption of the carbon dioxide and hydrogen sulphide formed during conversion and its temperature falls to 62° C. Before leaving the plant for further use the gas temperature is reduced to ambient temperature in the final cooler 116. The regenerated solution from the regenerating tower which has a temperature of about 80° C. is taken through the pipe 118 to the distributor head 120 of the saturator after having been heated in the heat exchanger 115 and the heater 119. The crude gas is preheated in the saturator and purified by the absorption of the carbon dioxide and the hydrogen sulphide. The solution which is cooled in the process is taken from the sump of the saturator and pumped through the pipe 121 into the head of the gas cooler where, as already described, it is further charged with hydrogen sulphide and carbon dioxide and heated. At a temperature of about 74° C. the solution then enters the regenerating tower through the pipe 126 to be regenerated therein by agitation and aeration. The cooler and saturator in this plant have a capacity which permits about ten times the volume of liquid to be circulated as in the system illustrated in FIGURE 1. For instance, in the present case this amounts to 80 m.³ per hour and suffices for scrubbing out the carbon monoxide to a residual content of 3.3% by volume.

In the plant illustrated in FIGURE 3, the saturator and cooler are each associated with absorbent circulating systems of their own, but both comprise a common regenerating tower. This plant is specially suitable for the conversion of gases at elevated pressures. The plant shown in FIGURE 3 comprises a converting tower 201, a saturator 202, a cooler 203 and a regenerating tower 204.

The crude gas enters the saturator through a pipe 210 and, after having been purified, heated and moistened therein, flows through a pipe 211 and a heat exchanger 212 into the converting tower 201. On its way to the tower compressed steam is admitted from a branch pipe 213 at a point preceding the heat exchanger 212.

The regenerated liquid absorbent is withdrawn from the sump of the regenerating tower 204 through a discharge pipe 217 and divided into two branches. One branch stream is pumped by a pump 218 in a pipe 219 through a heat exchanger 215 to a distributor 220 in the head of the saturator 202. The solution which has been cooled in the saturator is forced by the pressure in the saturator through a pipe 221 to a decompression valve 222 when it returns to the regenerating tower 204. The second branch stream leaving the regenerating tower 204 through pipe 217 is pumped by the pump 223 through pipe 224 and heat exchanger 225 and distributor head 226 in the top of cooler 203 from the bottom of which it leaves by pipe 227 and passes through valve 228 into the top of the regenerating tower 204.

The gas leaving the top of the converting tower 201 through pipe 214 passes through the heat exchangers 212 and 215 into the bottom of the cooling tower 203 for countercurrent contact with the solution supplied through distributor head 226, the gas passing from the top of tower 203 through pipe 216 which conveys it to the storage tank 231.

The joint regeneraion of both branch streams is performed by heating—boiling out—with the aid of a heating element 229 in the sump of the regenerating tower 204, possibly with the direct addition of steam admitted through a pipe 230. Suitable liquid absorbents are aqueous solutions of the alkali metal salts of weak inorganic or organic acids, which, as known, have an alkaline reaction, such as the alkali metal salts of carbonic acid, phosphoric acid, boric acid, arsenic acids, the simpler amino acids or phenols.

The following example will illustrate the manner in which plant according to FIGURE 3 functions, using a 26% aqueous solution of potash as absorbent:

*Example III*

A pre-purified water-gas of the following composition in percent by volume:

| | |
|---|---|
| $H_2S$ | (¹) |
| $CO_2$ | 6.0 |
| CO | 39.4 |
| $H_2$ | 49.2 |
| Hydrocarbons | 3.1 |
| $N_2$ | 2.0 |

¹ 0.0071=109 mg./stand. m.³

The hydrocarbons are those from $C_1$–$C_3$, i.e. methane, ethylene, propane, and propylene.

Under a pressure of 11 atm. gauge, this water-gas is to be transformed by conversion into a gas rich in hydrogen. The pre-purified water-gas enters the saturator at ambient temperature to be purified, heated and moistened therein by exposure to the trickling potash solution which has a temperature of 143° C. Upon leaving the saturator the gas still contains 2.3% by volume of carbon dioxide and 6 mg. of hydrogen sulphide per stand. m.³.

By admitting steam through the pipe 213, the gas temperature is further raised and the gas is enriched with steam. After having been still further heated in the heat exchanger 212 by heat exchange with previously converted gas, the crude pre-purified gas now attains the reaction temperature of 420° C. At this temperature it is converted by contact with an iron oxide catalyst.

The converted gas contains 30% by volume of carbon dioxide and 123 mg. of hydrogen sulphide per stand. m.³ which have been formed from organic sulphur compounds during conversion.

After heat exchange in the heat exchanger 212 with the gas which has not yet been converted and in the heat exchanger 215 with the absorbent solution entering the saturator, the converted gas enters the gas cooler 203 at a temperature of about 154° C. and is cooled to 105° C. by contact with the potash solution. This absorbs all but 1.9% by volume of the carbon dioxide and all but 2.9 mg. per stand. m.³ of hydrogen sulphide from the converted gas. The converted purified gas therefore now has the following composition in percent by volume:

| | |
|---|---|
| $H_2S$ | (¹) |
| $CO_2$ | 1.9 |
| CO | 2.4 |
| $H_2$ | 90.8 |
| Hydrocarbons | 3.1 |
| $N_2$ | 1.8 |

¹ 0.002=31 mg. per stand. m.³.

The hydrocarbons are those from $C_1$–$C_3$, i.e. methane, ethylene, propane, and propylene.

The potash solution is circulated at the rate of 17 m.³ through the saturator and 15 m.³ through the cooler per 1000 stand. m.³ of gas. The ratio of the two branch streams can be varied by adjustment of the performance of the two pumps 218 and 223.

The advantages of the present method consist in that corrosion due to the presence of hydrogen sulphide and oxygen in the saturator-cooler system is eliminated and that the gas purifying equipment which usually precedes and follows the conversion stage is saved because saturator and cooler in the converter system simultaneously function as absorbers.

It will be understood that the invention is susceptible to modification in order to adapt it to different usages and conditions, and, accordingly, it is desired to comprehend such modifications within the invention as may fall within the scope of the appended claim.

What is claimed as this invention is:

A cyclic process for recovering hydrogen, which process comprises the following steps:

(a) passing a crude gas containing hydrogen, carbon monoxide, carbon dioxide and hydrogen sulfide into a saturation zone, in contact with an aqueous alkaline solution containing a hydrogen sulfide and carbon dioxide absorbent selected from the group consisting of an alkali metal arsenate and an alkali metal ferricyanide, withdrawing at the top portion of said saturation zone the unabsorbed gases saturated with water vapor and withdrawing at the bottom portion of said saturation zone the said aqueous alkaline absorbent solution, passing on and distributing the said solution at the top of the cooling zone;

(b) introducing steam into the unabsorbed gases and then passing the said unabsorbed gases saturated with water vapor and containing the aforesaid introduced steam into a catalyst reaction zone wherein the said gases and water vapor are catalytically reacted at 350–500° C. to produce hydrogen and carbon dioxide;

(c) passing the resultant reacted gases from the catalytic reaction zone to the bottom portion of the cooling zone wherein said gases are cooled by countercurrent contact with the absorbent solution supplied thereto, to thereby further remove carbon dioxide and hydrogen sulfide impurities from said reacted gases;

(d) withdrawing the purified hydrogen-containing reacted gases from the top portion of said cooling zone;

(e) recycling to the top of the saturation zone a portion of the aqueous alkaline absorption solution withdrawn from the bottom of the said cooling zone, and transferring the remaining portion of the aqueous alkaline absorption solution withdrawn from the bottom portion of the cooling zone to the regenerating zone, aerating the latter solution therein for precipitating sulfur, removing the said sulfur by filtration, and recycling the said regenerated aqueous alkaline solution free from precipitated sulfur to the top of said saturation zone.

References Cited by the Examiner

UNITED STATES PATENTS

| | | | |
|---|---|---|---|
| 2,577,017 | 12/1951 | Kemp | 23—213 X |
| 2,934,407 | 4/1960 | Simonek et al. | 23—213 |
| 2,943,910 | 7/1960 | Giammarco | 23—2 |
| 2,983,585 | 5/1961 | Smith | 23—213 |

FOREIGN PATENTS

| | | |
|---|---|---|
| 498,796 | 1/1939 | Great Britain. |

OSCAR R. VERTIZ, *Primary Examiner.*

MAURICE A. BRINDISI, *Examiner.*

E. C. THOMAS, B. H. LEVENSON,
*Assistant Examiners.*